US012000297B2

(12) United States Patent
Moody et al.

(10) Patent No.: US 12,000,297 B2
(45) Date of Patent: Jun. 4, 2024

(54) ENDWALL PLUG COOLING SYSTEM

(71) Applicants: Rolls-Royce North American Technologies Inc., Indianapolis, IN (US); Rolls-Royce Corporation, Indianapolis, IN (US)

(72) Inventors: Jack Moody, Indianapolis, IN (US); Kevin P. Holley, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/471,898

(22) Filed: Sep. 21, 2023

(65) Prior Publication Data

US 2024/0011414 A1 Jan. 11, 2024

Related U.S. Application Data

(63) Continuation of application No. 17/556,524, filed on Dec. 20, 2021, now Pat. No. 11,788,431.

(51) Int. Cl.

| | |
|---|---|
| ***F01D 25/12*** | (2006.01) |
| ***F01D 9/04*** | (2006.01) |
| ***F01D 21/00*** | (2006.01) |

(52) U.S. Cl.

CPC ............... *F01D 25/12* (2013.01); *F01D 9/04* (2013.01); *F01D 21/003* (2013.01); *F05D 2240/128* (2013.01); *F05D 2260/201* (2013.01); *F05D 2260/202* (2013.01); *F05D 2260/232* (2013.01); *F05D 2260/80* (2013.01)

(58) Field of Classification Search

CPC .......... F01D 21/003; F01D 25/12; F01D 9/04; F05D 2260/80; F05D 2240/128

See application file for complete search history.

(56) References Cited

U.S. PATENT DOCUMENTS

| | | | | |
|---|---|---|---|---|
| 10,996,140 | B2 * | 5/2021 | Barker | G01L 19/0092 |
| 2013/0340443 | A1 * | 12/2013 | Salles | F01D 25/12 60/803 |
| 2020/0284693 | A1 * | 9/2020 | Barker | G01K 13/02 |

FOREIGN PATENT DOCUMENTS

| | | | |
|---|---|---|---|
| EP | 3 705 860 | A1 | 9/2020 |

* cited by examiner

*Primary Examiner* — Eldon T Brockman

(74) *Attorney, Agent, or Firm* — Barnes & Thornburg LLP

(57) ABSTRACT

A cooling system includes a nozzle guide vane endwall. The nozzle guide vane endwall includes a first wall and a second wall. The first wall includes a first opening that extends completely through the first wall into a primary flow path of a high-pressure turbine. The second wall includes a second opening and a third opening that extend completely through the second wall into an inner passageway of the nozzle guide vane endwall. The inner passageway is configured to direct a cooling fluid to the first opening and/or the second opening via at least the third opening. The first and second opening are configured to receive a plug or a probe.

20 Claims, 8 Drawing Sheets

ENDWALL PLUG COOLING SYSTEM

CROSS REFERENCE TO RELATED APPLICATIONS

This application is a continuation of U.S. Ser. No. 17/556,524, "ENDWALL PLUG COOLING SYSTEM," filed Dec. 20, 2021, the entire disclosure of which is herein expressly incorporated by reference.

TECHNICAL FIELD

The present subject matter relates to gas turbine engines and, in particular, to techniques for cooling components of gas turbine engines.

BACKGROUND

Present cooling systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

The present subject matter discloses a cooling system for a plug or a sensor probe disposed within a gas turbine engine. The plug or the sensor probe may be disposed, for example, within a borescope port of a nozzle guide vane (NGV) endwall. By providing the cooling system in accordance with the disclosed subject matter, the plug or the sensor probe may be less susceptible to failure.

The borescope port may receive the plug and/or the sensor probe, such as a borescope. Pressure and/or temperature readings obtained from the sensor probe in the turbine section itself can be used to obtain, for example, an indication of a turbine section blockage condition. However, the environment in the turbine is quite hostile with gas temperatures often exceeding common material limits. Accordingly, the sensor probe may be replaced by the plug when the sensor probe is not in use. The sensor probe may also be referred to herein as simply "probe" for readability.

Figure 1:
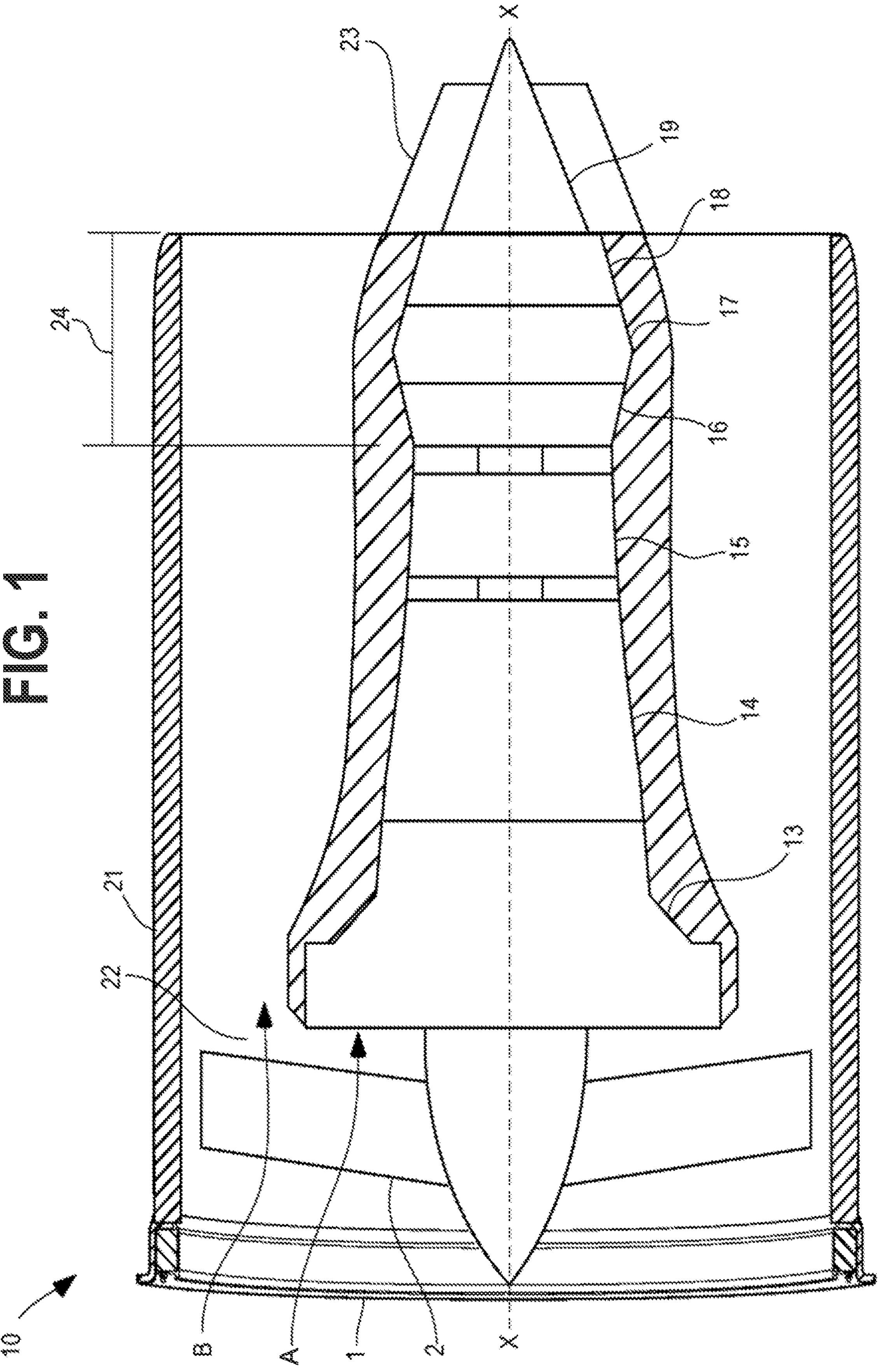
FIG. 1 illustrates a generalized diagram of a gas turbine engine.

With reference to FIG. 1, a gas turbine engine 10 is illustrated, which is particularly adapted for use as an aircraft jet engine. If desired, the gas turbine engine may instead provide motive power to one or more other loads, such as a generator as part of a genset. The engine 10 has a longitudinal rotational axis X-X and comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the gas turbine engine 10 and defines the intake 11, a bypass duct 22, and a bypass exhaust nozzle 23.

During operation, air entering the intake 11 is accelerated by the fan 12 to produce two air flows: a first primary airflow A which passes into the intermediate pressure compressor 13 and a second air flow B which passes through the bypass duct 22 to provide propulsive thrust. The intermediate pressure compressor 13 compresses the primary airflow A directed into it before delivering that air to the high-pressure compressor 14 where further compression takes place.

The compressed air exhausted from the high-pressure compressor 14 is directed into the combustion equipment 15 where it is mixed with fuel and combusted. The resultant hot combustion products then expand and drive the high, intermediate, and low-pressure turbines 16, 17, 18 before being exhausted through the nozzle 19 to develop additional thrust. The high, intermediate, and low-pressure turbines 16-18 drive the high and intermediate pressure compressors 14, 13 and the fan 12 via one or more shafts. While FIG. 1 illustrates an embodiment of a gas turbine engine, other embodiments (not shown) may have different component configurations including additional or fewer components, such as engines that do not include intermediate compressors or turbines or engines such as a turbojet that do not have a bypass flow.

Figure 2:
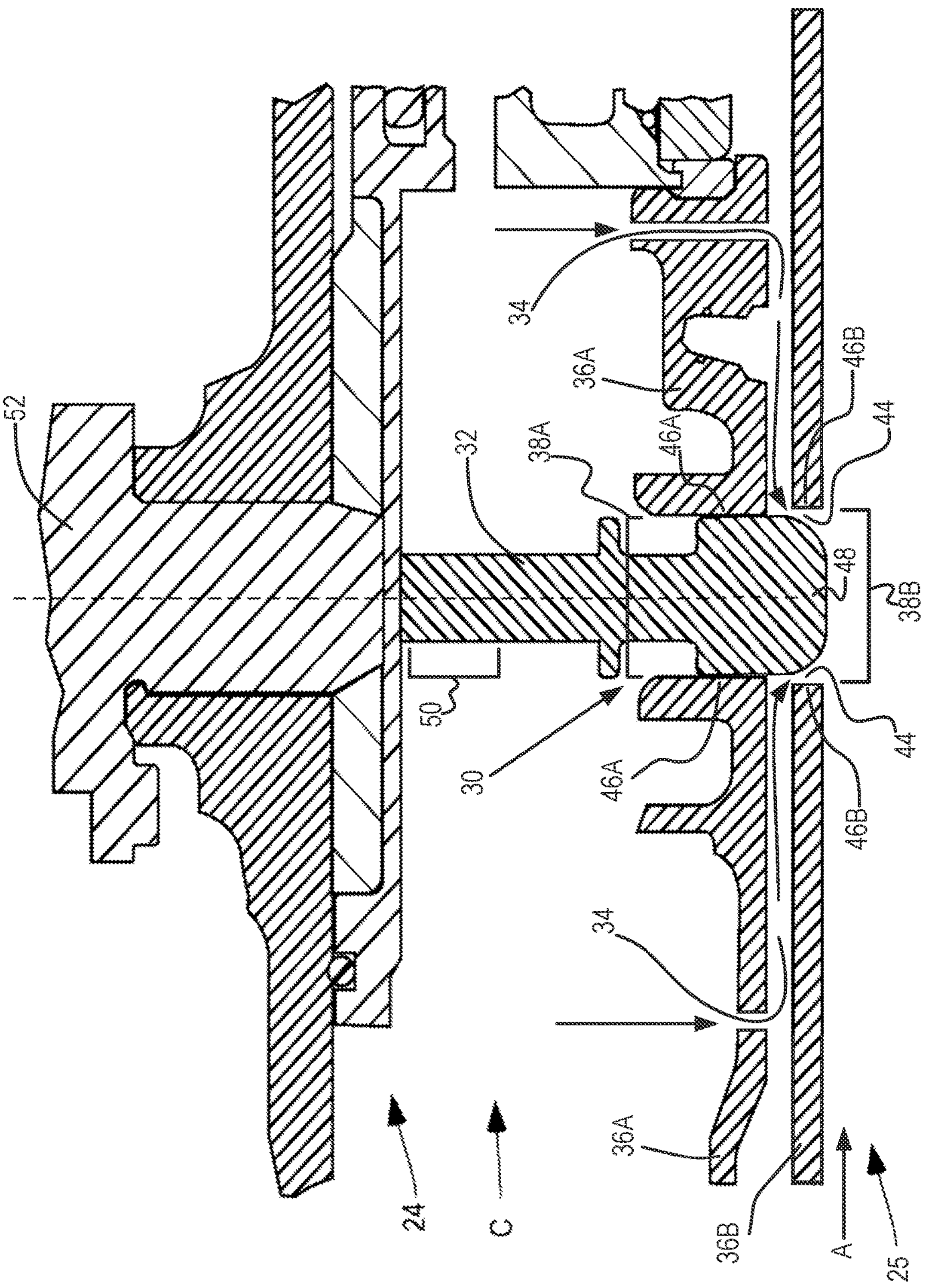
FIG. 2 illustrates an example fragmentary sectional view of a portion of the gas turbine engine of FIG. 1.

FIG. 2 illustrates a cross-sectional view of a first example of a dual-wall-walled NGV endwall assembly 25 located in or immediately upstream of a turbine section of a gas turbine engine. In the illustrated example, the dual-walled NGV endwall assembly 25 includes a first wall 36B and a second wall 36A forming one or more inner passageways 34. The first wall 36B includes a first opening 38B and located between the primary flowpath A and the inner passageway 34. The second wall 36A includes a second opening 38A and is located adjacent the first wall 36B. The inner passageway 34 is configured to receive a coolant air flow or cooling fluid C, which will be subsequently described. Both openings 38A/38B may collectively form a borescope port 30 into which a plug 32 or a probe (not shown) may be installed to partially or substantially seal one or more of the first opening 38B or second opening 38A by sealing to the respective first wall 36B or second wall 36A. As used herein, the term "substantially" is understood to mean to a large extent, preferably to the greatest extent practically possible. In the context of a seal, one of ordinary skill in the art would understand that a perfect seal only theoretically exists. Therefore, to substantially seal an opening means to seal less than perfectly, but sufficiently to keep leakage to a minimum. As shown in the example of FIG. 2, the plug 32 is substantially sealed in the second opening 38A but not in the first opening 38B because of a gap 44 between the plug 32 and sides 46B of the first opening 38B. The gap 44 helps to cool a tip 48 of the plug 32 or the probe disposed in the borescope port 30, as will be further described.

Upstream in a compressor of the gas turbine engine, the first airflow A or, more generally, the primary airflow A, may be compressed by a compressor, such as the intermediate pressure compressor 13 or the high-pressure compressor 14, to obtain compressed air. A portion of the compressed air, known as compressor bleed air, may be diverted through passages (not shown) and provided as a coolant air flow or cooling fluid C to the dual-walled NGV endwall assembly 25. The coolant air flow or cooling fluid C may be further diverted through the one or more inner passageways 34 to provide additional cooling to the plug 32 via the double wall structure formed by the first and second walls 36A/36B. The leading edge, or leftmost edge in the drawing, of the plug 32 or the probe, more specifically, the leftmost edge of the tip 48 of the plug 32 or the probe, may be prone to higher temperatures than the trailing or rightmost edge of plug 32 or the probe due to facing the primary airflow A. The primary airflow A passing the NGV endwall assembly 25 is very hot having just exited the combustor. By providing the coolant air flow or cooling fluid C to the plug 32 or the probe via the one or more inner passageways 34, the temperature gradient across the plug 32 or the probe may be reduced such that the temperature of the plug 32 or the probe becomes more uniform, thus reducing the likelihood of failure due to thermal stress. Alternatively, or in addition, the overall temperature of the plug 32 or the probe may be lowered.

The NGV endwall assembly 25 is a component disposed between the combustion equipment 15 and the high-pressure turbine 16 of the gas turbine engine 10. A plurality of circumferentially spaced nozzle guide vanes (NGVs) may define a turbine nozzle. The turbine nozzle may be provided following the combustion equipment 15 to direct the hot primary airflow A to the rotor blades of the high-pressure turbine 16. Each of the circumferentially spaced NGVs (not shown) may be grouped into arcuate NGV segments, where each NGV segment may include one or more NGVs. Collectively, the NGV segments form a 360° turbine nozzle. Within each NGV segment, the one or more NGVs may be coupled to an endwall, which is referred to herein as the NGV endwall assembly 25. The endwall may be, for example, an inner endwall or an outer endwall. The outer endwall is located radially outward, with respect to a center axis of the gas turbine engine, from the inner endwall. For each of the NGVs in the NGV segment, the outer endwall has an opening (not shown) configured to receive one end of the NGV, and the inner endwall has an opening configured to receive the other end of the NGV.

The borescope port 30 may be any structure configured to receive the probe. For example, the structure of the borescope port 30 may include the portion of the first and second walls 36A/36B comprising the first and second openings 38A/38B. As another example, the structure of the borescope port 30 may include a threaded portion 50, which an end 52 (shown immediately above the plug 32 in FIG. 2) of the probe or the plug 32 may screw into. The first opening 38B and the second opening 38A may be aligned axially such that the centers of the first and second opening 38A/38B share a common axis and/or a common center. In an example, the first opening 38B may be between 1.00 and 1.05 centimeters, preferably between 1.02 and 1.03 centimeters. The second opening 38A may be sized the same as the first opening 38B. Both the first and second openings 38A/38B may extend completely through the corresponding first and second walls 36A/36B. The leading or leftmost edge of the first opening 38B may be prone to higher temperatures than the trailing or rightmost edge of first opening 38B due to facing the primary airflow A. The first and second openings may be circular in shape, although other shapes may be possible without departing from the scope of the present subject matter.

The plug 32 or the probe may be disposed in the borescope port 30 to partially or substantially seal the first opening 38B and/or the second opening 38A. The plug 32 or the probe may be dimensioned to substantially fill the first and/or the second openings 38A/38B in order to provide a seal. The plug 32 may be constructed from a material such as a metal alloy that is suitable to withstand the high temperatures found within the NGV endwall assembly 25 of the gas turbine engine 10. The plug 32 may be shaped to accommodate the shape of the first and/or second openings 38A/38B. For example, where the first and/or second openings 38A/38B are circular and share a same central axis, the plug 32 may be cylindrically shaped with or without a taper.

Where the first or second openings 38A/38B are only partially or otherwise not substantially sealed, the gap 44 may exist between the plug 32 or the probe and the sides 46A/46B of the first and/or second openings 38A/38B. The gap 44 may be, for example, between 0.1 and 0.5 millimeters, preferably 0.1 millimeters. The gap 44 between the plug 32 and sides 46A/46B of the first and/or second opening 38A/38B may allow the diverted cooling fluid C to pass through the first and/or second opening 38A/38B as previously explained.

The gap 44 between the plug 32 and the sides 46A/46B of the first and/or second opening 38A/38B may be achieved in a variety of ways. For example, the diameter of the plug 32 or the probe may be tapered along its length while the width of the first and/or second openings 38A/38B are substantially identical. Alternatively, or in addition, the plug 32 or the probe may substantially seal the second opening 38A, but length of the plug 32 or the probe may stop short of intersecting the first opening 38B. Alternatively, or in addition, the first opening 38B may be offset from the second opening 38A. Alternatively, or in addition, the width of the first and second openings 38A/38B may be different, such that the width of the first or second opening 38A/38B is greater than the width of the other opening 38A/38B while the diameter of the plug 32 or the probe remains uniform. In general, where the first and second opening 38A/38B are circular in shape, for example, the plug 32 or the probe may be configured in a corresponding matching shape, at least in terms of the cross section of the plug 32 or the probe, so as to make sealing the first and/or second opening 38A/38B possible. Any combination of the aforementioned examples may be contemplated without departing from the scope of the present subject matter.

The borescope port 30 is sometimes provided adjacent the high-pressure turbine 16, and the borescope port 30 is typically sealed during engine operation by a borescope plug 32 or the probe positioned in the borescope port 30. Typically, inspection of the turbine 16 is undertaken by removing the plug 32 and inserting a borescope camera (not shown) through the borescope port 30 while the engine is off (in other words, not operating). The camera may be configured as a probe so as to seal with one or more of the first or second openings 38A/38B as described herein. Thereafter, the plug 32 is reinserted into the borescope port 30 before the gas turbine engine 10 is started.

As shown by the arrows in FIG. 2, the cooling fluid C may be diverted via inner passageway 34 to provide impingement cooling to the plug 32 or the probe as the diverted cooling fluid C strikes a side surface of the plug 32 or the probe in a direction substantially perpendicular to the longitudinal axis of the plug 32 or the probe. In this example, substantially perpendicular may mean perpendicular to a large extent, such as within 45 degrees or less, preferably 15 degrees or less of being truly perpendicular. The diverted cooling fluid C may also provide film cooling as the cooling fluid C passes downward along the length of the plug 32 or the probe through the second opening 38A toward the primary airflow A. The downward diverted cooling fluid C along the length of the plug 32 or the probe may be substantially parallel to the longitudinal axis of the plug 32 or the probe. The inner passageway 34 may surround the plug 32 or the probe, which may be better understood with reference to FIGS. 6A-6C as subsequently discussed.

It should be appreciated that while two inner passageways 34 are shown in the example of FIG. 2, any number of inner passageways 34 may be provided, such as a single internal passageway as subsequently depicted in FIG. 3, or more than two internal passageways without departing from the scope of the present subject matter. Providing additional cooling to the plug 32 or the probe may reduce the risk of overheating and subsequent failure of the plug 32 or the probe due to non-uniform heating, for example, as previously discussed. As shown in FIG. 2 and with respect to a direction of flow of coolant air flow or cooling fluid C, a second inner passageway 34 to the right may be disposed downstream of a first inner passageway 34, which is shown on the left. The second inner passageway 34 may direct the cooling fluid to strike the plug 32 or the probe in a direction substantially opposite to the direction in which the first inner passageway directs the diverted cooling fluid C, as shown in FIG. 2.

According to one aspect and as discussed specifically hereinafter, the plug 32 is replaced by a probe that removably and partially or substantially seals the borescope port 30 and allows for the addition of a sensor instrument. The sensor instrument of the probe may include a camera, a thermocouple, a pressure tap, a sand and dust blockage sensor, a deflection gauge, and/or any other type of sensor that fits within the dimensions of the probe. The probe may be exposed to the coolant air flow or cooling fluid C and benefit therefrom in the sense that service life is improved even while readings related to the turbine section can be obtained. Leads to the sensor may be fed back through a housing of the probe to a data acquisition system (not shown). In a specific example, the probe is designed to extend sufficiently into the primary airflow A in the turbine section to obtain temperature and/or pressure readings. In addition, since the probe may be removed from the gas turbine engine 10, the probe may be tested in the laboratory to gauge the remaining life thereof, thus providing quantitative information in addition to allowing visual inspection using the borescope camera. Furthermore, one or more probes can be swapped in or out of the borescope port 30, and this ability provides the opportunity to quickly test different instrumentation configurations for engine diagnostics without the cost of stripping the gas turbine engine 10. This is particularly useful for severe turbine environments since the probe (and instrumentation) can be replaced before risking exposing the engine to a DOD (domestic object damage) event.

Figure 3:
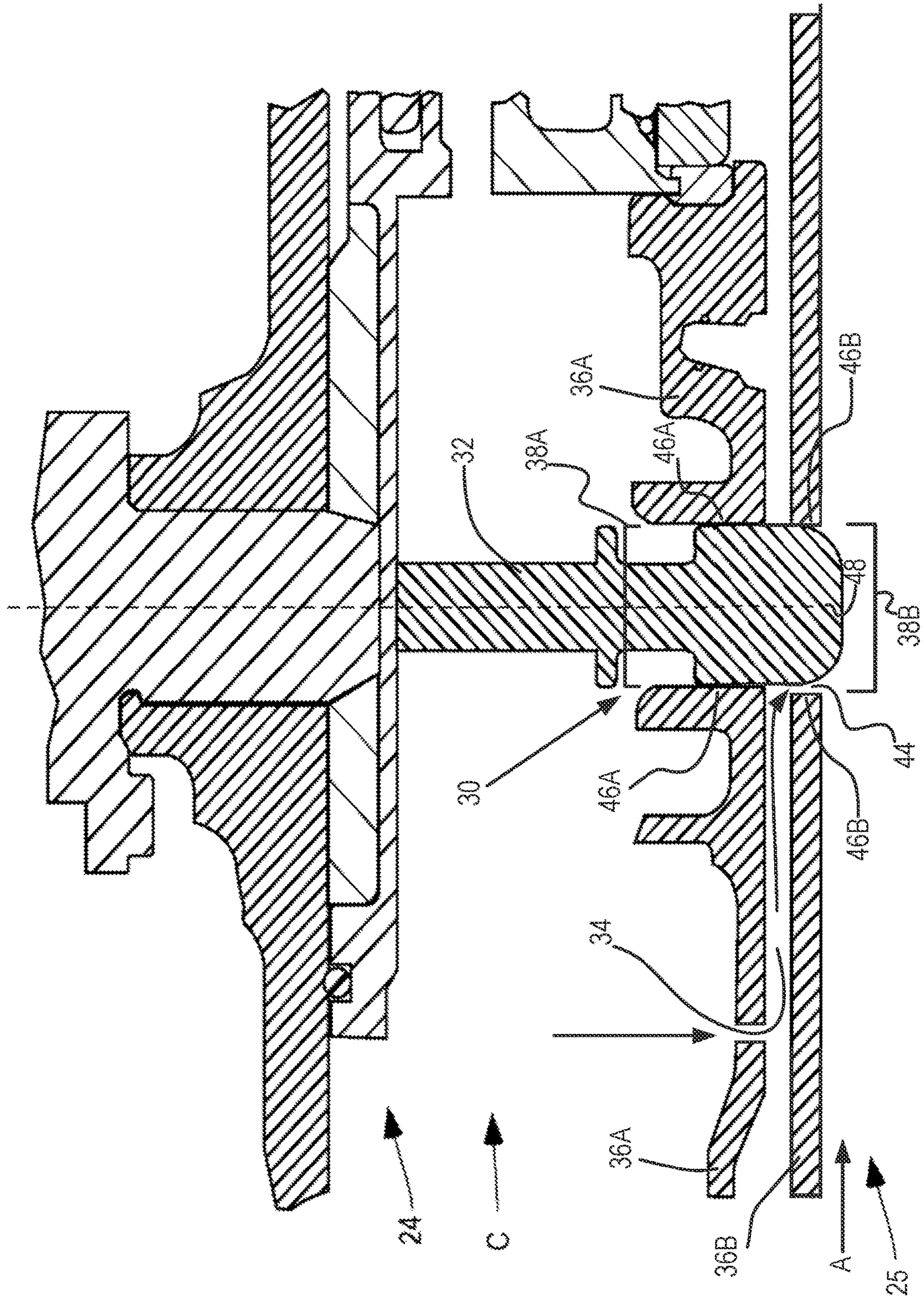
FIG. 3 illustrates an example fragmentary sectional view of a portion of the gas turbine engine of FIG. 1.

FIG. 3 shows an additional example cross-sectional view of a portion of the gas turbine engine of FIG. 1. In this example, the plug 32 or the probe may be dimensionally modified to leave a gap 44 between a portion of the plug 32 or the probe and the sides 46B of the first opening 38B. In this way, the gap 44 may exist partially around a circumference of the plug 32 or the probe within the first and/or second opening 38A/38B. In this example where the first and/or second opening 38A/38B is configured to be circular in shape, the plug 32 may be radially asymmetric. A remaining portion of the plug 32 may be substantially sealed to the second wall 36A. In this example, the gap 44 may be disposed on a side of the plug 32 that faces toward the flow of the diverted cooling fluid C and faces toward the flow of primary airflow A. Providing the gap 44 on the side of the plug 32 or the probe facing the primary airflow A may reduce the temperature on the same side of the plug 32 or the probe to offset the propensity for this side of the plug 32 or the probe to become hotter than the opposing side of the plug 32 or the probe during operation of the gas turbine engine 10.

Alternatively, or in addition, the plug 32 or the probe may include linear or spiral-shaped flutes, splines, or the like to allow the passage of the diverted cooling fluid C to pass through the first and/or second openings 38A/38B and reach the primary airflow A, thereby cooling the plug 32 or the probe in the process. With any of the aforementioned example techniques previously described to create the gap 44 between the plug 32 or the probe and sides 46A/46B of the first and/or second opening 38A/38B by adjusting the dimensions of the plug 32 or the probe, it should be appreciated that the techniques are equally applicable to the first and/or second walls 36A/36B. For instance, alternatively or in addition to creating a tapered plug 32 to achieve the described gap 44, the first and second openings 38A/38B may be tapered or otherwise differ in size to allow the diverted cooling fluid C to pass through the first and/or second openings 38A/38B. Alternatively, or in addition, the first wall 36B may be larger or smaller in width or diameter than the second wall 36A, for example.

Figure 4:
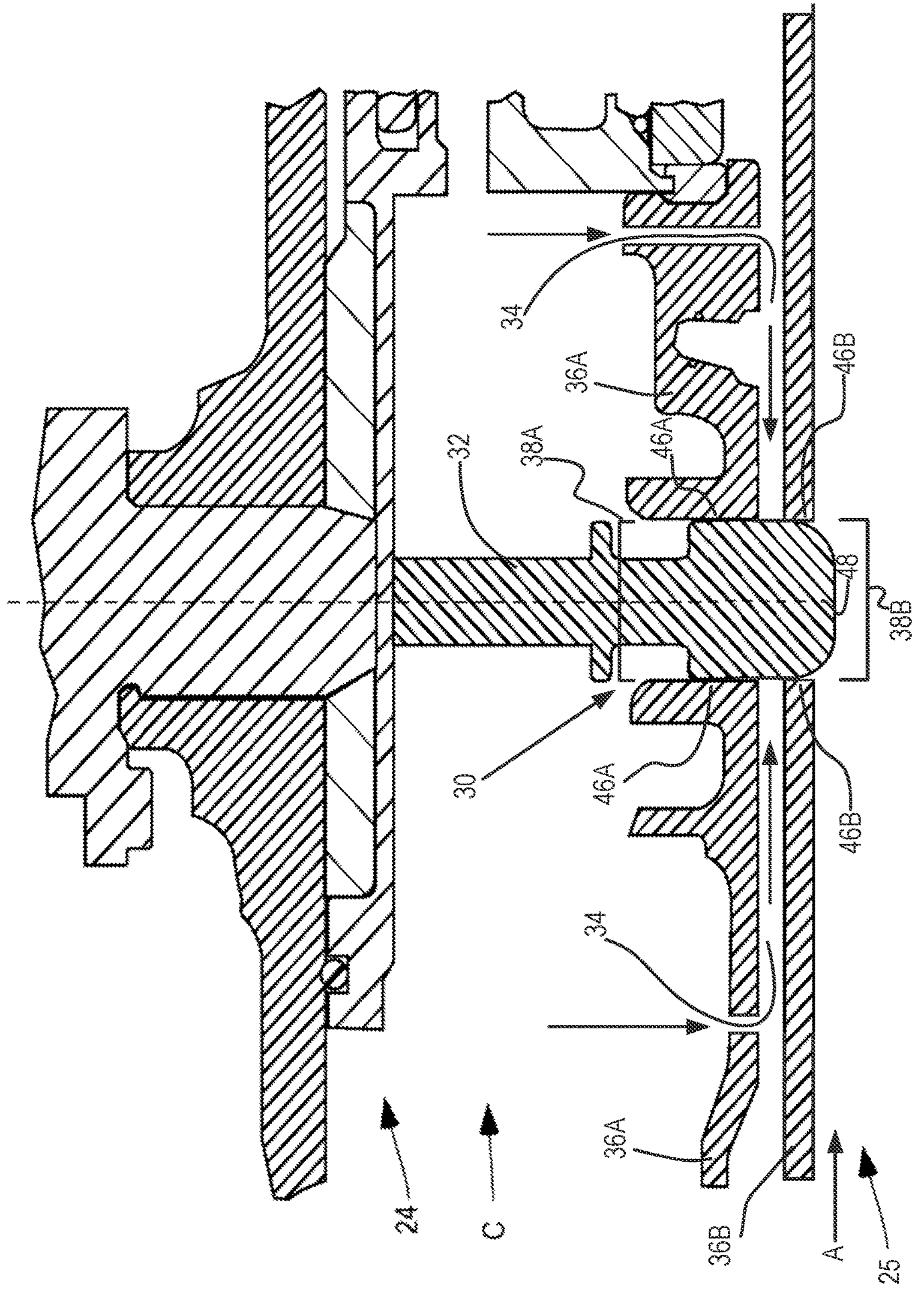
FIG. 4 illustrates an example fragmentary sectional view of a portion of the gas turbine engine of FIG. 1.

FIG. 4 shows an additional example cross-sectional view of a portion of the gas turbine engine of FIG. 1. In this example, the plug 32 or the probe may be dimensionally modified to leave no gap 44 at either the first wall 36B or second wall 36A. As indicated by the arrows, the diverted cooling fluid C may flow through one or more inner passageways 34 to cool the plug 32 or the probe without passing into the primary airflow A. With any of the aforementioned example techniques previously described to create the gap 44 between the plug 32 or the probe and the sides 46A/46B of the first and/or second openings 38A/38B by adjusting the dimensions of the plug 32 or the probe, it should be appreciated that the techniques are equally applicable to the first and/or second walls 36A/36B. For instance, alternatively or in addition to creating a tapered plug 32 to achieve the described gap 44, the first and second openings 38A/38B may be tapered or otherwise differ in size to allow the diverted cooling fluid C to pass through the first and/or second openings 38A/38B. While first and second inner passageways 34 are shown in the example of FIG. 4, as discussed with reference to FIG. 2, more or less inner passageways 34 may be utilized without departing from the scope of the present subject matter.

Figure 5:
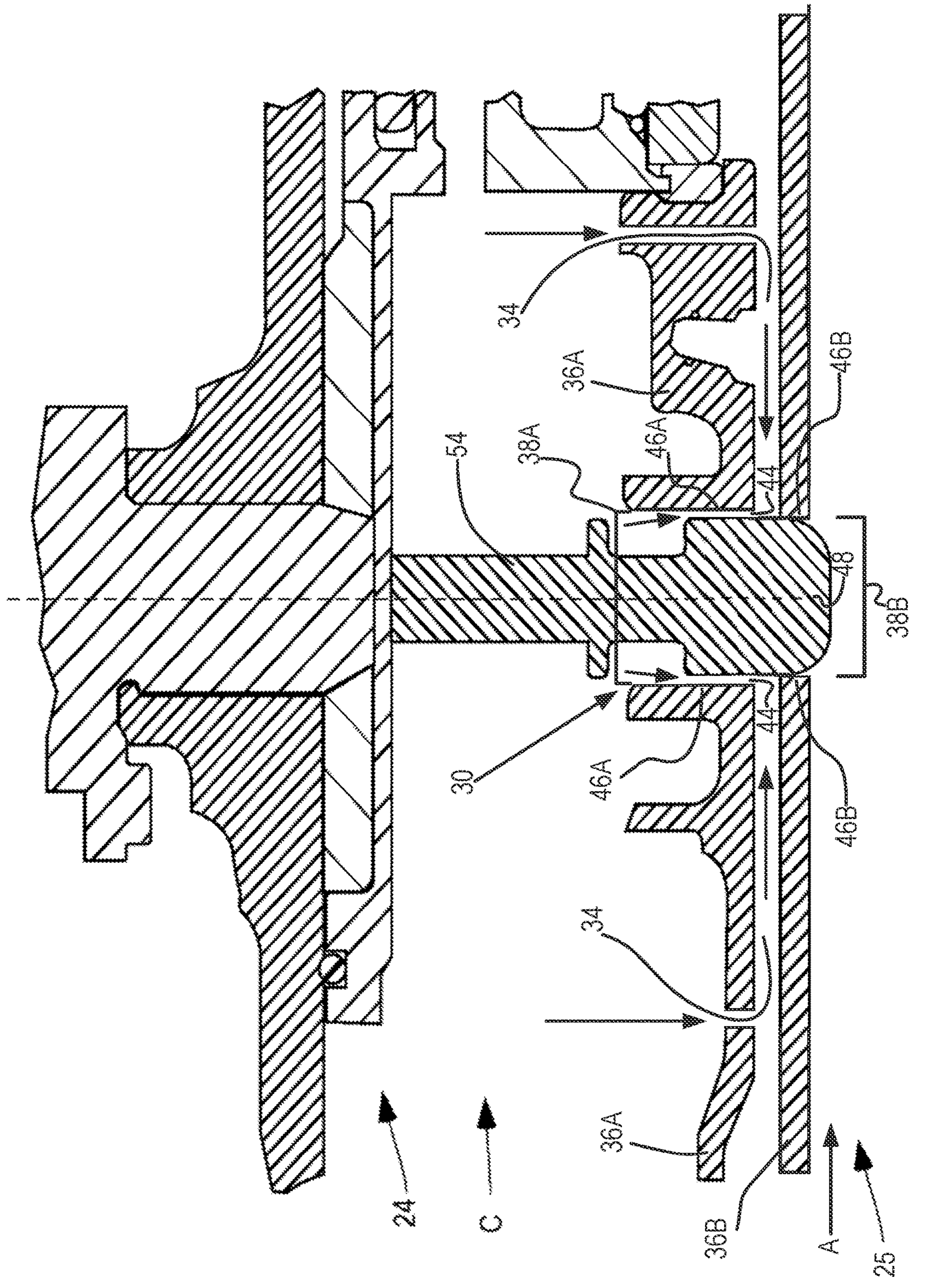
FIG. 5 illustrates an example fragmentary sectional view of a portion of the gas turbine engine of FIG. 1.

FIG. 5 shows an additional example cross-sectional view of a portion of the gas turbine engine of FIG. 1. In this example, a probe 54 is shown in the borescope port 30. In addition, the first opening 38B and the second opening 38A are sized to leave the gap 44 at the second wall 36A rather than the first wall 36B. As indicated by the arrows, the diverted cooling fluid C may flow through one or more inner passageways 34 and/or via the second opening 38A to cool the plug 32 or the probe 54 without passing to the primary airflow A. As in the previous discussion of FIG. 3, the plug 32 or the probe 54 may be dimensionally modified to leave the gap 44 between a portion of the plug 32 or the probe 54 and the sides 46B of the first opening 38B. In this way, the gap 44 may exist partially around a circumference of the plug 32 or the probe 54 within the second opening 38A. The gap 44 may be disposed on a side of the plug 32 or the probe 54 that faces toward the flow of the diverted cooling fluid C and faces toward the flow of primary airflow A. Providing the gap 44 on the side of the plug 32 or the probe 54 facing the primary airflow A may reduce the temperature on the same side of the plug 32 or the probe 54 to offset the propensity for this side of the plug 32 or the probe 54 to become hotter than the opposing side of the plug 32 or the probe 54 during operation of the gas turbine engine 10.

Alternatively, or in addition, the plug 32 or the probe 54 may include linear or spiral-shaped flutes, splines, or the like to allow the passage of the diverted cooling fluid C to pass through the first and/or second openings 38A/38B and reach the primary airflow A, thereby cooling the plug 32 or the probe 54 in the process. With any of the aforementioned example techniques previously described to create the gap 44 between the plug 32 or the probe 54 and the sides 46A/46B of the first and/or second openings 38A/38B by adjusting the dimensions of the plug 32 or the probe 54, it should be appreciated that the techniques are equally applicable to the first and/or second walls 36A/36B. For instance, alternatively or in addition to creating a tapered plug 32 to achieve the described gap 44, the first and second openings 38A/38B may be tapered or otherwise differ in size to allow the diverted cooling fluid C to pass through the first and/or second openings 38A/38B. Alternatively, or in addition, the first wall 36B may be larger or smaller in width or diameter than the second wall 36A, for example.

Figure 6A:
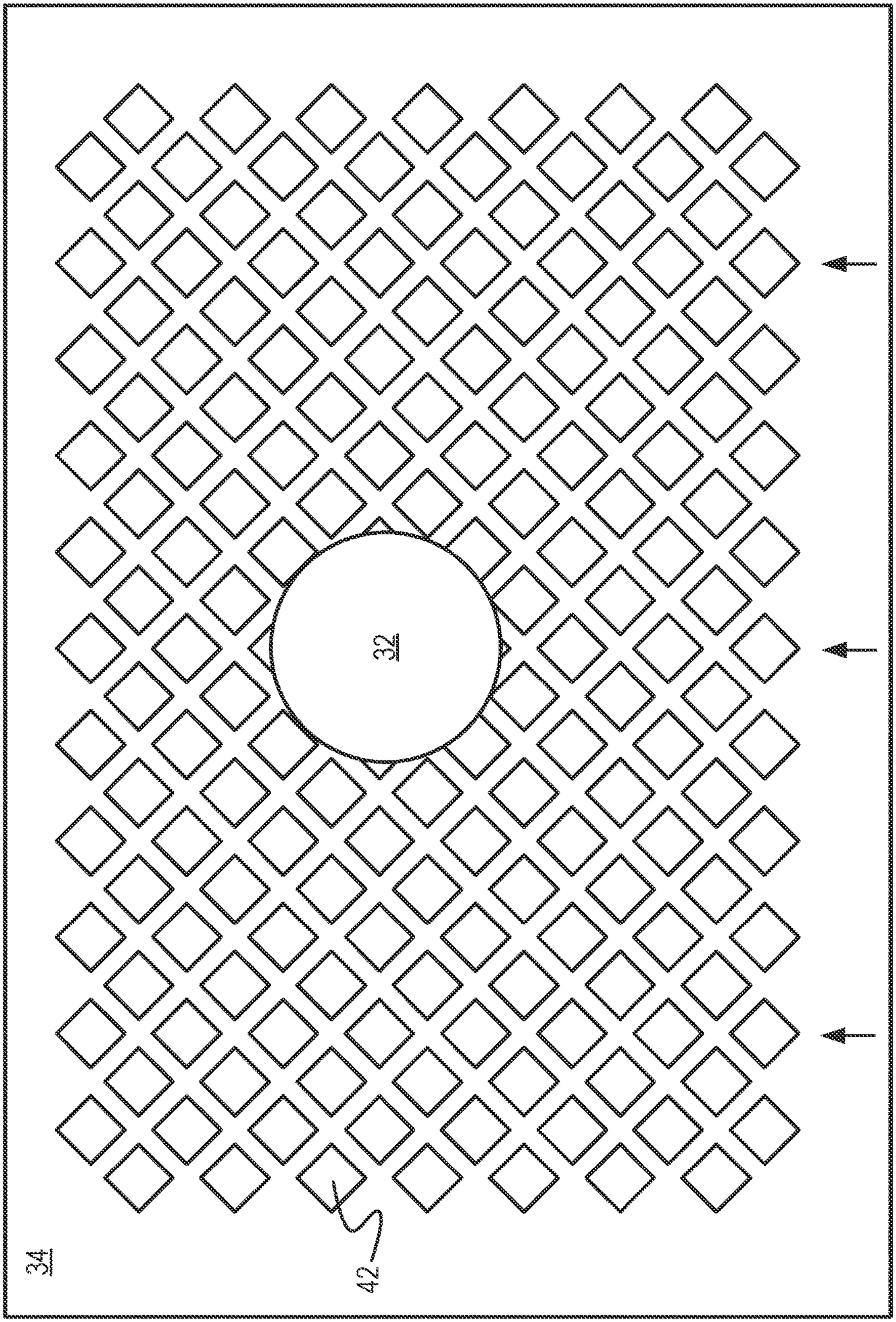
FIG. 6A illustrates an example fragmentary sectional view of a portion of an inner passageway.

FIG. 6A illustrates a top view of an example inner passageway 34 having an open pattern that may allow a high degree of cooling fluid C to reach the plug 32. As discussed with reference to the previously-described examples, a plug 32 or port may be disposed within the inner passageway 34 as shown. The inner passageway 34 may incorporate dams and pedestals 42 to control the cooling pattern with respect to the plug 32. The direction of the diverted coolant air flow or cooling fluid C as it flows toward the plug 32 or the probe 54 is depicted by the arrows as shown in FIG. 6. One or more of the pedestals 42 may be uniformly or randomly dispersed through the inner passageway(s) 34 and protrude from the first and/or second wall 36A/36B into the inner passageway(s) 34 to divert the cooling fluid C. One or more dams (not shown) may also be disposed, with or without the accompanying pedestals 42, on the first and/or second wall 36A/36B to reflect the cooling fluid C to the plug 32 or the probe 54 or to the area surrounding the first and/or second openings 38A/38B more generally.

Figure 6B:
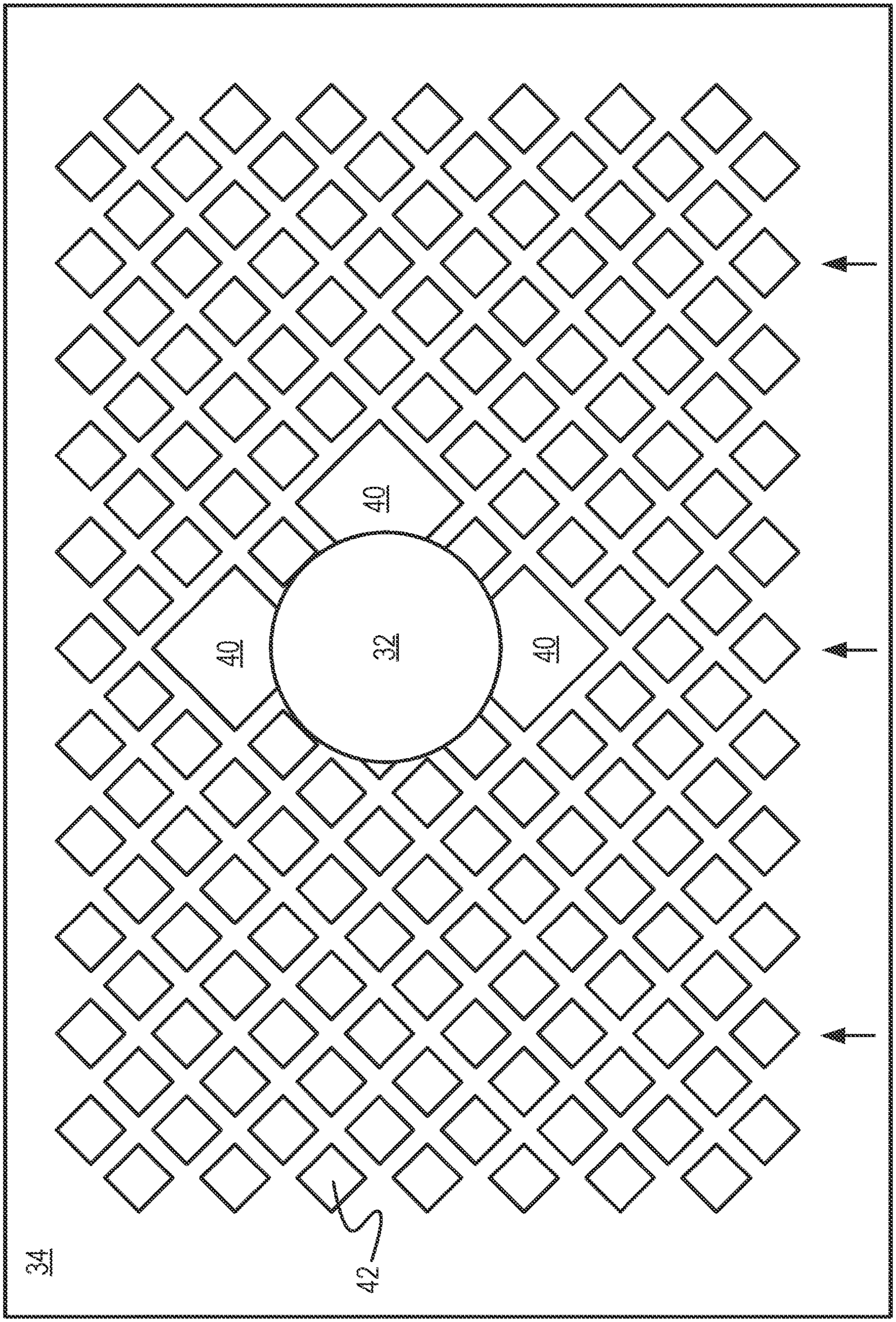
FIG. 6B illustrates an example fragmentary sectional view of a portion of an inner passageway.

FIG. 6B illustrates a top view of an example inner passageway 34 having a partial pattern that may allow a lower degree of cooling fluid C from reaching the plug 32 than in the example of FIG. 6A. As discussed with reference to the previously-described examples, a plug 32 or port may be disposed within the inner passageway 34 as shown. The inner passageway 34 may incorporate dams 40 and pedestals 42 to control the cooling pattern with respect to the plug 32. The direction of the diverted coolant air flow or cooling fluid C as it flows toward the plug 32 or the probe 54 is depicted by the arrows as shown in FIG. 6. One or more of the pedestals 42 may be uniformly or randomly dispersed through the inner passageway(s) 34 and protrude from the first and/or second wall 36A/36B into the inner passageway(s) 34 to divert the cooling fluid C. One or more dams 40 may also be disposed, with or without the accompanying pedestals 42, on the first and/or second wall 36A/36B to reflect the cooling fluid C to the plug 32 or the probe 54 or to the area surrounding the first and/or second openings 38A/38B more generally.

Figure 6C:
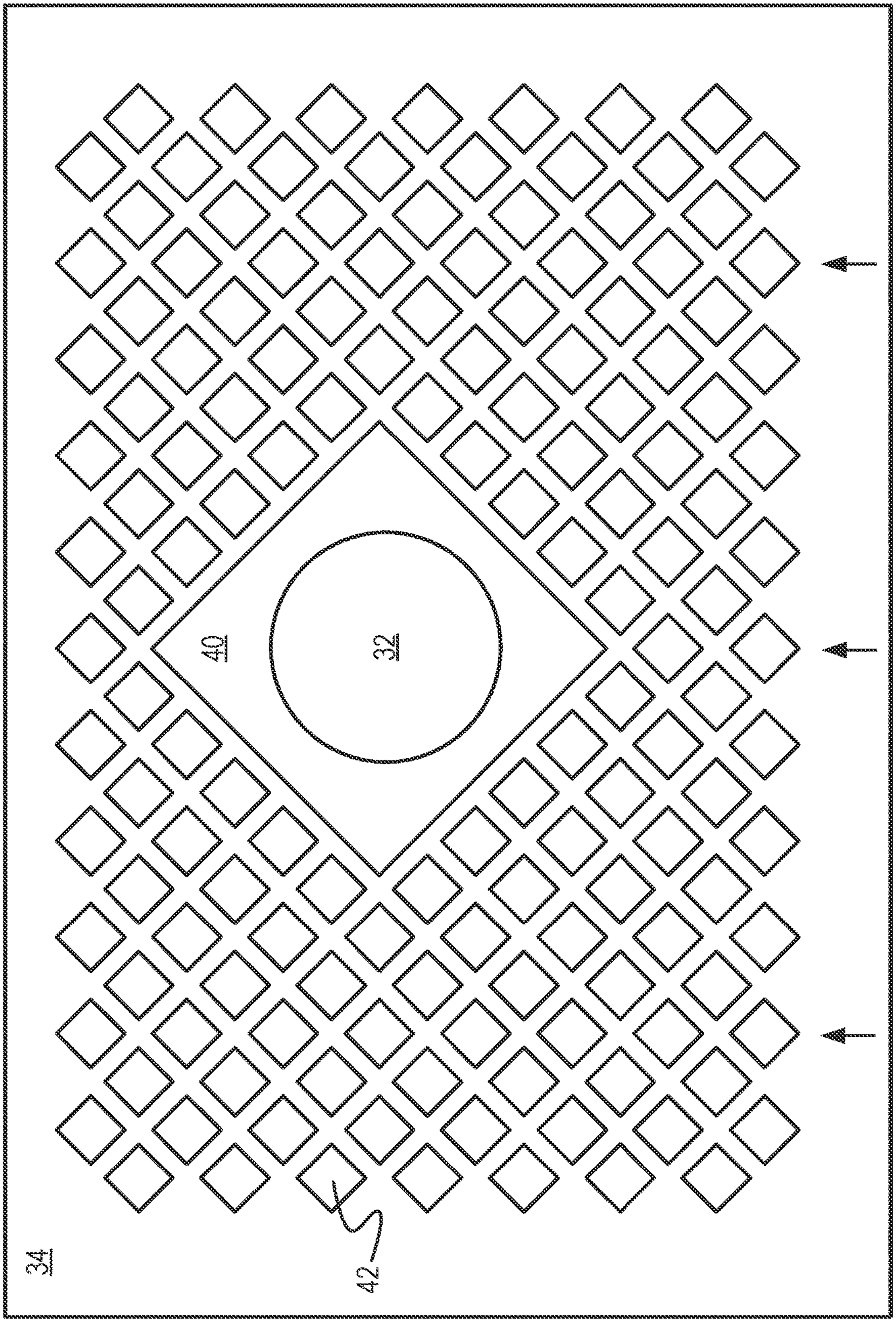
FIG. 6C illustrates an example fragmentary sectional view of a portion of an inner passageway.

FIG. 6C illustrates a top view of an example inner passageway 34 having a closed pattern that may prevent the cooling fluid C from directly reaching the plug 32. As discussed with reference to the previously-described examples, a plug 32 or port may be disposed within the inner passageway 34 as shown. The inner passageway 34 may incorporate dams 40 and pedestals 42 to control the cooling pattern with respect to the plug 32. The direction of the diverted coolant air flow or cooling fluid C as it flows toward the plug 32 or the probe 54 is depicted by the arrows as shown in FIG. 6. One or more of the pedestals 42 may be uniformly or randomly dispersed through the inner passageway(s) 34 and protrude from the first and/or second wall 36A/36B into the inner passageway(s) 34 to divert the cooling fluid C. One or more dams 40 may also be disposed, with or without the accompanying pedestals 42, on the first and/or second wall 36A/36B to reflect the cooling fluid C to the plug 32 or the probe 54 or to the area surrounding the first and/or second openings 38A/38B more generally.

To clarify the use of and to hereby provide notice to the public, the phrases "at least one of <A>, <B>, . . . and <N>" or "at least one of <A>, <B>, . . . or <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a cooling system, comprising: a nozzle guide vane endwall, comprising: a first wall comprising a first opening that extends completely through the first wall into a primary flow path of a high-pressure turbine, and a second wall comprising a second opening and a third opening that extend completely through the second wall into an inner passageway of the nozzle guide vane endwall, wherein the inner passageway is configured to direct a cooling fluid to the first opening and/or the second opening via at least the third opening, and the first and second opening are configured to receive a plug or a probe.

A second aspect relates to the cooling system of aspect 1, further comprising: the plug or the probe disposed in the first opening and the second opening, wherein the plug or the probe substantially seals the second opening.

A third aspect relates to any preceding aspect, further comprising: the plug or the probe disposed in the first opening and the second opening, wherein the plug or the probe only partially seals the second opening.

A fourth aspect relates to any preceding aspect, wherein the first opening and the second opening together form a borescope port.

A fifth aspect relates to any preceding aspect, further comprising: the plug or the probe disposed in the first opening and the second opening, wherein the inner passageway is configured to direct the cooling fluid to strike the plug or the probe in a direction substantially perpendicular to a longitudinal axis of the plug or the probe to provide impingement cooling of the plug or the probe.

A sixth aspect relates to any preceding aspect, further comprising: the plug or the probe disposed in the first opening and the second opening, wherein the second opening is configured to direct the cooling fluid substantially parallel to a longitudinal axis of the plug or the probe to provide film cooling of the plug or the probe.

A seventh aspect relates to any preceding aspect, wherein the third opening directs at least a portion of the cooling fluid to bypass the second opening.

An eighth aspect relates to any preceding aspect, wherein the inner passageway comprises a pedestal and/or dam configured to divert and/or reflect the cooling fluid.

A ninth aspect relates to any preceding aspect, wherein the first and second walls form a portion of the inner passageway; and the first wall provides a barrier between the inner passageway and the primary flow path.

A tenth aspect relates to any preceding aspect, further comprising: the plug or the probe disposed in the first opening and the second opening, wherein a gap is between the plug or the probe and the second wall within the second opening.

An eleventh aspect relates to any preceding aspect, wherein the plug or the probe substantially seals the first opening.

A twelfth aspect relates to any preceding aspect, wherein the gap between the plug or the probe and the second wall within the second opening is configured to receive the cooling fluid from the inner passageway.

A thirteenth aspect relates to any preceding aspect, further comprising: the plug or the probe disposed in the first opening and the second opening, wherein with respect to the primary flow path, the third opening is disposed upstream of the plug or the probe.

A fourteenth aspect relates to any preceding aspect, wherein the inner passageway is a first inner passageway; and the cooling system further comprises: the plug or the probe disposed in the first opening and the second opening, and a second inner passageway, wherein with respect to the primary flow path, the second inner passageway is disposed downstream of the plug or the probe and the first inner passageway.

A fifteenth aspect relates to a cooling system, comprising: a nozzle guide vane endwall including: a first wall comprising a first opening that extends completely through the first wall into a primary flow path of a turbine, a second wall comprising a second opening and a third opening that extend completely through the second wall into an inner passageway of the nozzle guide vane endwall, wherein a center of the first opening is aligned with a center of the second opening, the inner passageway is formed by the first wall and the second wall, the inner passageway is configured to direct a cooling fluid to the first opening, and the inner passageway comprises a pedestal and/or dam arranged to direct the cooling fluid toward the first opening; and a plug or a probe disposed in the first opening and the second opening, wherein the plug or the probe substantially fills the second opening of the second wall, and a gap is between the first wall and the plug or the probe.

A sixteenth aspect relates to the cooling system of aspect 15, wherein the third opening directs the cooling fluid into the inner passageway.

A seventeenth aspect relates to the cooling system of aspects 15 or 16, wherein the third opening directs at least a portion of the cooling fluid to bypass the second opening.

An eighteenth aspect relates to the cooling system of aspects 15-17, wherein the first opening and the second opening form a borescope port.

A nineteenth aspect relates to the system of aspects 15-18, wherein the inner passageway surrounds the plug or the probe.

A twentieth aspect relates to a cooling system, comprising: a nozzle guide vane endwall, comprising: a first wall comprising a first opening that extends completely through the first wall, wherein the first wall is configured to face a primary flow path of a high-pressure turbine, and a second wall comprising a second opening and a third opening that extend completely through the second wall, wherein: the first wall and the second wall define an inner passageway of the nozzle guide vane endwall; the third opening directs a cooling fluid into the inner passageway; the first and second opening are part of a borescope port configured to receive a plug or a probe through the first wall and the second wall; and the inner passageway is configured to direct a cooling fluid to the borescope port.

In addition to the features mentioned in each of the independent aspects enumerated above, some examples may show, alone or in combination, the optional features mentioned in the dependent aspects and/or as disclosed in the description above and shown in the figures.

What is claimed is:

1. A cooling system, comprising:

a nozzle guide vane endwall, comprising:

a first wall comprising a first opening that extends completely through the first wall into a primary flow path of a high-pressure turbine, and a second wall comprising a second opening and a third opening that extend completely through the second wall into an inner passageway of the nozzle guide vane endwall, wherein the inner passageway is configured to direct a cooling fluid to the first opening and/or the second opening via at least the third opening, and the first and second opening are configured to receive a plug or a probe.

2. The cooling system of claim 1, further comprising:

the plug or the probe disposed in the first opening and the second opening, wherein the plug or the probe substantially seals the second opening.

3. The cooling system of claim 1, further comprising:

the plug or the probe disposed in the first opening and the second opening, wherein the plug or the probe only partially seals the second opening.

4. The cooling system of claim 1, wherein the first opening and the second opening together form a borescope port.

5. The cooling system of claim 1, further comprising:

the plug or the probe disposed in the first opening and the second opening, wherein the inner passageway is configured to direct the cooling fluid to strike the plug or the probe in a direction substantially perpendicular to a longitudinal axis of the plug or the probe to provide impingement cooling of the plug or the probe.

6. The cooling system of claim 1, further comprising:

the plug or the probe disposed in the first opening and the second opening, wherein the second opening is configured to direct the cooling fluid substantially parallel to a longitudinal axis of the plug or the probe to provide film cooling of the plug or the probe.

7. The cooling system of claim 1, wherein the third opening directs at least a portion of the cooling fluid to bypass the second opening.

8. The cooling system of claim 1, wherein the inner passageway comprises a pedestal and/or dam configured to divert and/or reflect the cooling fluid.

9. The cooling system of claim 1, wherein the first and second walls form a portion of the inner passageway; and the first wall provides a barrier between the inner passageway and the primary flow path.

10. The cooling system of claim 1, further comprising:

the plug or the probe disposed in the first opening and the second opening, wherein a gap is between the plug or the probe and the second wall within the second opening.

11. The cooling system of claim 10, wherein the plug or the probe substantially seals the first opening.

12. The cooling system of claim 10, wherein the gap between the plug or the probe and the second wall within the second opening is configured to receive the cooling fluid from the inner passageway.

13. The cooling system of claim 1, further comprising:

the plug or the probe disposed in the first opening and the second opening, wherein with respect to the primary flow path, the third opening is disposed upstream of the plug or the probe.

14. The cooling system of claim 1, wherein the inner passageway is a first inner passageway; and the cooling system further comprises:

the plug or the probe disposed in the first opening and the second opening, and a second inner passageway, wherein with respect to the primary flow path, the second inner passageway is disposed downstream of the plug or the probe and the first inner passageway.

15. A cooling system, comprising:

a nozzle guide vane endwall including:

a first wall comprising a first opening that extends completely through the first wall into a primary flow path of a turbine, a second wall comprising a second opening and a third opening that extend completely through the second wall into an inner passageway of the nozzle guide vane endwall, wherein a center of the first opening is aligned with a center of the second opening, the inner passageway is formed by the first wall and the second wall, the inner passageway is configured to direct a cooling fluid to the first opening, and the inner passageway comprises a pedestal and/or dam arranged to direct the cooling fluid toward the first opening; and a plug or a probe disposed in the first opening and the second opening, wherein the plug or the probe substantially fills the second opening of the second wall, and a gap is between the first wall and the plug or the probe.

16. The cooling system of claim 15, wherein the third opening directs the cooling fluid into the inner passageway.

17. The cooling system of claim 16, wherein the third opening directs at least a portion of the cooling fluid to bypass the second opening.

18. The cooling system of claim 15, wherein the first opening and the second opening form a borescope port.

19. The cooling system of claim 15, wherein the inner passageway surrounds the plug or the probe.

20. A cooling system, comprising:

a nozzle guide vane endwall, comprising:

a first wall comprising a first opening that extends completely through the first wall, wherein the first wall is configured to face a primary flow path of a high-pressure turbine, and a second wall comprising a second opening and a third opening that extend completely through the second wall, wherein:

the first wall and the second wall define an inner passageway of the nozzle guide vane endwall;

the third opening directs a cooling fluid into the inner passageway;

the first and second opening are part of a borescope port configured to receive a plug or a probe through the first wall and the second wall; and the inner passageway is configured to direct a cooling fluid to the borescope port.

* * * * *